United States Patent Office 3,810,768
Patented May 14, 1974

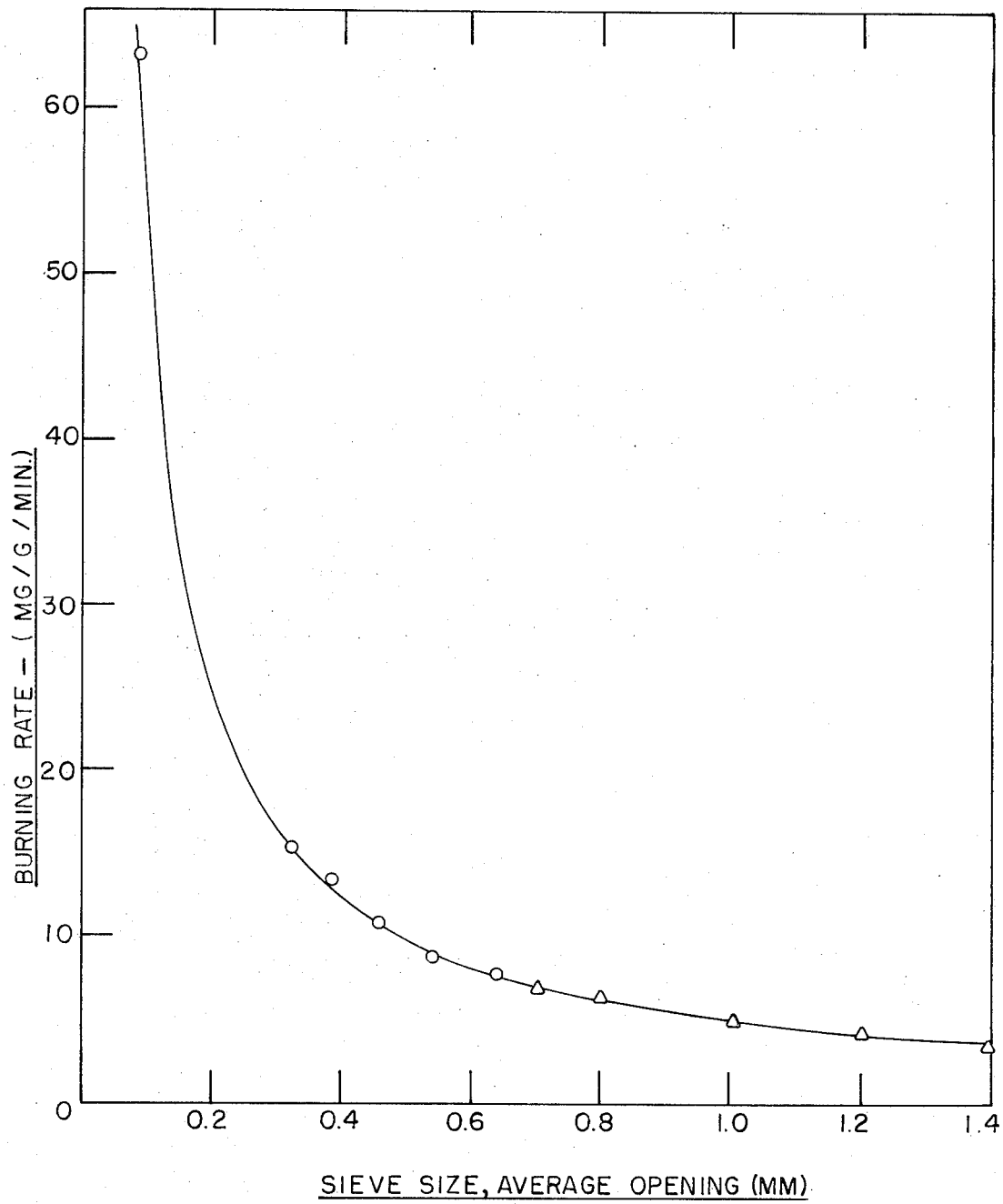
BURNING RATE OF GRADED MADAGASCAR GRAPHITE VS. SIEVE SIZE

3,810,768
REFRACTORY COMPOSITION COMPRISING COARSE PARTICLES OF CLAY OR BAUXITE AND CARBON
Joseph R. Parsons, Park Forest, and Harold L. Rechter, Chicago, Ill., assignors to Chicago Fire Brick Company, Chicago, Ill.
Filed Apr. 6, 1972, Ser. No. 241,785
Int. Cl. C04b 35/52
U.S. Cl. 106—56    1 Claim

ABSTRACT OF THE DISCLOSURE

A refractory composition suitable for ramming monolithic refractory linings such as for cupolas and blast furnaces comprises coarse particles of calcined clay or calcined bauxite and coarse particles of amorphous carbon or graphite with plastic clay; and may also include particles of silicon or ferrosilicon, pitch and green binders. The particle size of the calcined clay, bauxite and carbon is such that at least 30 percent of said material has a grain size from 30 mesh to 1½ inches diameter, and preferably at least 60 percent from 30 mesh to ¼ inch diameter. In such compositions the carbon is protected at elevated temperatures such as 1600° F.–2600° F.

BACKGROUND OF THE INVENTION

The invention relates to refractory compositions suitable for ramming monolithic refractory linings such as for cupolas, blast furnaces and for other high temperature exposures, particularly linings contacted with molten metals and slags. More particularly the invention relates to refractory compositions comprising clay or bauxite and carbon.

An object of this invention is to take advantage of the excellent refractory properties of carbons and graphites for refractory use. Carbon does not wet molten metal and will not melt. Its great weakness is that it will oxidize at very low temperatures and burn rapidly at temperatures above about 1200° F. So this invention is designed to develop high carbon and graphite bodies in refractory ramming and plastic mixes which are capable of protecting themselves to high temperatures such as 1600° F.–2600° F.

Mixes have been made in the past using fluxes and silica to surface seal and protect the graphite. The usual plastics and ramming mixes contain about 15 percent graphite and flux to seal the surface and retain the carbon. These fluxes are usually taken from the following group: ground glass, boric acid, trisodium phosphate and sodium silicate. To work properly a film forming refractory is also included such as silica in the form of sand or flour. Mixes containing as high as 35 percent carbon may be protected in this manner.

Also, the prior art discloses bodies containing carbon among other materials using silicon or ferrosilicon to obtain a strong bond. Hilton (U.S. 3,227,566), Saunders (U.S. 3,291,623 and U.S. 3,329,514) and Brockbank (U.S. 1,483,507) disclose this and prefire in a reducing atmosphere prior to putting the material into service. Saunders considers the bond formed to be of silicon nitride. Zeitch (U.S. 3,409,451) achieves oxidation resistance using silicon and other additions to graphite by hot pressing to full density and impermeability. Nickerson (U.S. 3,083,111) employs silicon in carbon brick to obtain alkali resistance, no reference to oxidation. Barlow (U.S. 3,410,930) used silicon in acid refractory linings to prevent iron oxide intrusions into the refractory, citing some compositions with up to 15 percent carbon. In no case was a relatively coarse grain structure used to inhibit oxidation of carbon prior to the reactivity of the silicon additions.

SUMMARY OF THE INVENTION

To widen the use of carbon and graphite in refractory compositions we have developed formulations having the necessary grain structure for protecting the carbon grain at temperatures below which fluxing oxidation protecting agents become effective, i.e., below 1600° F., and which include nonfluxing metallic additions which provide protection to very high temperatures, e.g., 2550° F. The nonfluxing additions, namely silicon and ferrosilicon metals, do not soften the body at temperature and, on the other hand, form reaction products with carbon to achieve very high strengths.

The preferred grain structure utilizes a blending of relatively coarse mineral aggregates and carbons along with finer materials for proper workability, densification, strength and film forming properties. Formulations of fine inorganic matter with coarse carbons, fine carbon with coarse inorganic, or all relatively fines are not nearly so protective of the carbon.

The type of refractory formulation embodied in this invention, useful for ramming plastics in critical cupola, blast furnace and electric furnace areas may be characterized as follows:

|  | Percent by weight |
|---|---|
| Calcined clay or calcined bauxite aggregates containing at least a 30% portion above 30 mesh (U.S. standard screen) and up to 1½ in. diameter and preferably at least 60% above 30 mesh and up to ¼ in. grain size | 60–16 |
| Amorphous carbon or graphite of grain sizing, such that at least a 30% portion is above 30 mesh and up to 1½ in. diameter and preferably at least 60% above 30 mesh and up to ¼ in. diameter | 12–70 |
| Plastic clays | 4–24 |
| Pitch | 0–12 |
| Silicon or ferrosilicon 60–325 mesh (U.S. Standard Screen) | 0–30 |
| Lignin liquor | 0–5 |
| Glassy sealer | 0–4 |

The particle size of the plastic clay and pitch is not important, but preferably the clay is —20 mesh.

The glass sealer is preferably ground glass, trisodium phosphate, boric acid or sodium silicate.

The silicon or ferrosilicon is preferably present in 4–30 percent of 48–100 percent silicon content.

Refractory products placed by ramming, whether by mechanical or hand devices, do not attain nearly theorectical densities and are necessarily porous, permitting oxygen permeation deep into the structure. The use of a larger particle size carbon or graphite exposes less area for oxidation, slowing the process. The larger inorganic matrix grains aid in densification on forming, and better serve as oxidation barriers against neighboring carbon grains.

This grain structure provides the necessary protection for a refractory placement where sagger or other reducing atmosphere firings are inconvenient during heat-up to the temperature at which the silicon or ferrosilicon reacts to form a protective film on oxidation. Silicon will increase over 100 percent in weight on full oxidation with consequent expansion and protection of the carbon grain. The silicon has in the meantime reacted with the carbon to form a silicon rich layer on the surface of the carbon grains, resulting in a considerable strengthening of the body.

DESCRIPTION OF THE PREFERRED EMBODIMENTS AND THE DRAWING

The following formulation has been field tested in cupola breast block areas of most severe metal erosion and oxidation, remaining substantially intact, and is representative of the compositional field of this invention:

EXAMPLE 1

| | Percent |
|---|---|
| ¼ to ⅛ in. calcined South American bauxite | 18.3 |
| —⅛ in. calcined South American bauxite | 18.3 |
| ¼ in. to 30 mesh natural graphite | 18.3 |
| —35 mesh natural graphite | 7.3 |
| Missouri fireclay | 18.3 |
| Pitch | 8.3 |
| Lignin liquor | 1.8 |
| 98% silicon, —200 mesh | 9.2 |

The use of pitch has no bearing on the invention, as its absence or presence has not affected oxidation behavior materially in the examples to be given, although too rapid curing can open cracks in the structure. Any somewhat plastic clay, whether ball clay, kaolin or bentonite, will provide the needed working properties for a ramming mix.

F. with a 5 hour hold and 1½ hour to 1600° F. with a 5 hour hold. Furnace temperatures were sufficiently hot to oxidize carbon for 16–18 hours after shut-off. On breaking the brick, thin carbon-free surface layers would be seen with the carbonaceous core intact.

It is seen in Table I that the controls without silicon, Nos. 1 and 2, do not oxidize badly at 1600° F., losing 25 percent of the carbon in an open fire of a relatively small mass exposing 5 sides of a brick. Similar materials prepared either with fine mineral aggregates or fine carbon grains were more seriously oxidized at 1600° F. and almost completely so at 2550° F. The silicon additions provided an obvious advantage in oxidation protection and in strengthening of the body after a 2550° F. fire. The use of 18 percent silicon, No. 11, reduced oxidation to only an 8 percent carbon loss. Note the advantageous combination of a glassy sealer, such as trisodium phosphate, with the silicon (Nos. 4 and 9).

The high strengths developed in the bodies with over

TABLE I.—EFFECT OF SILICON ADDITIONS AND CARBON CONSTITUENTS ON OXIDATION OF CARBON RAMMING MIXES

Pressed 9 x 4½ x 2½ inch specimens

| | 1 | 2 | 3 | 4 | 5 | 6 | 7 | 8 | 9 | 10 | 11 | 12 |
|---|---|---|---|---|---|---|---|---|---|---|---|---|
| Ingredients (wt. percent): | | | | | | | | | | | | |
| ¼ to ⅛ in. bauxite | 20.2 | 20.2 | 16.0 | 18.9 | 18.3 | 18.0 | 18.3 | 18.3 | | 18.3 | 9.2 | 10.2 |
| —⅛ in. bauxite | 20.2 | 20.2 | 20.0 | 18.9 | 18.3 | 9.0 | 9.2 | | 17.8 | 18.3 | 18.3 | 18.1 |
| ¼ in. to 30 mesh graphite | 20.2 | 20.2 | 20.0 | 18.9 | 18.3 | 27.0 | 18.3 | 27.5 | 35.5 | 18.3 | 18.3 | 18.3 |
| —35 mesh graphite | 8.1 | | 8.0 | 7.6 | 7.3 | 18.0 | 16.5 | 16.5 | 17.8 | | 7.3 | 7.3 |
| —60 mesh calcined carbon | | 8.1 | | | | | | | | 7.3 | | |
| Missouri fireclay | 20.2 | 20.2 | 20.0 | 18.9 | 18.3 | 9.0 | 18.3 | 18.3 | 8.9 | 18.3 | 18.3 | 18.3 |
| Pitch | 9.1 | 9.1 | 9.0 | 8.5 | 8.3 | 8.1 | 8.3 | 8.3 | 8.0 | 8.3 | 8.3 | 16.5 |
| Lignin liquor | 2.0 | 2.0 | 2.0 | 1.9 | 1.8 | 1.8 | 1.8 | 1.8 | 1.8 | 1.8 | 1.8 | 1.8 |
| Trisodium phosphate | | | | 1.5 | | | | | 1.4 | | | |
| —200 mesh 98% silicon | | 5.0 | 4.7 | 9.2 | 9.0 | 9.2 | 9.2 | 9.2 | 8.9 | 9.2 | 18.3 | 9.2 |
| Bulk density (lbs./ft.³): | | | | | | | | | | | | |
| 2,550° F | 96 | | 104 | 110 | 115 | 95 | 103 | 102 | 101 | 111 | 110 | 90 |
| 1,600° F | 111 | 109 | | 112 | 115 | 95 | 101 | 96 | 100 | 109 | 99 | 84 |
| 220° F | 134 | 127 | 127 | 125 | 129 | 116 | 124 | 120 | 115 | 124 | 121 | 116 |
| Modulus of rupture (p.s.i.): | | | | | | | | | | | | |
| 2,550° F | 86 | | 382 | 327 | 575 | 510 | 791 | 887 | 784 | 465 | 516 | 211 |
| 1,600° F | 142 | 152 | | 223 | 318 | 140 | 151 | 152 | 257 | 278 | 197 | 144 |
| Linear change (percent): | | | | | | | | | | | | |
| 2,550° F | +.11 | | —.16 | —.11 | —.17 | —.38 | +.11 | —.11 | —.83 | —.17 | +.50 | +1.33 |
| 1,000° F | —.11 | —.39 | | —.11 | —.22 | +.05 | 0 | —.11 | +.11 | +.17 | +.05 | +.66 |
| Carbon content (percent) | 27.2 | 27.8 | 26.9 | 25.5 | 24.7 | 40.1 | 32.0 | 39.4 | 46.6 | 25.3 | 24.7 | 28.8 |
| Percent of carbon lost: | | | | | | | | | | | | |
| 2,550° F | 74 | | 36 | 23 | 21 | 29 | 22 | 23 | 17 | 15 | 8 | 25 |
| 1,600° F | 25 | 31 | | 19 | 21 | 17 | 38 | 35 | 14 | 15 | 21 | 41 |

The above composition of Example 1 is No. 5 in Table I showing several variations using 98 percent silicon for oxidation protection. Water was added for pressing of brick specimens, but data shown is on a dried basis. Carbon contents in Table I are corrected for ash levels and for pitch volatiles. The overall weight losses of firing these materials were corrected by sagger fire results to separate losses due to clay calcination and pitch volatilization from oxidized carbon loss. The weight gain on oxidizing silicon was ignored as it could not be measured and occurs as a thin layer mainly on the surface of the 9 x 4½ x 2½ inch brick specimens. The firings shown were 3 hours to 2550°

50 percent nominal carbon product additions (graphite and carbon grains and pitch) makes feasible the use of such high carbon contents for maximum efficiency in handling of molten metals and slags without the need for providing such as prebonded carbon shapes. Refiring of once fired broken brick of Table I compositions to 2550° F. results in a thin protective film on the broken surface with little additional weight loss.

TABLE II.—EFFECT OF GRAIN SIZING AND FERROSILICON ADDITIONS ON OXIDATION OF CARBON RAMMING MIXES AT 2,550° F.

Pressed 9 x 4½ x 2½ inch specimens

| | 1 | 2 | 3 | 4 | 5 | 6 | 7 | 8 |
|---|---|---|---|---|---|---|---|---|
| Ingredients (wt. percent): | | | | | | | | |
| ½ to ¼ in. S. Am. bauxite | | | | | | 24.7 | | |
| ¼ to ⅛ in. S. Am. bauxite | 20.2 | 22.1 | 18.3 | 22.5 | 27.0 | | 24.7 | 22.2 |
| —⅛ in. S. Am. bauxite | 20.2 | 14.7 | 18.3 | | | | | 11.1 |
| ¾ to ¼ in. natural graphite | | | | | | | | 22.2 |
| ¼ in. to 30 mesh natural graphite | 20.2 | 22.1 | 18.3 | 22.5 | 27.0 | 24.7 | | |
| —35 mesh natural graphite | 8.1 | 8.8 | 7.3 | 9.0 | 5.4 | 9.9 | 9.9 | 8.9 |
| Coarse coal, ¾ in. and finer | | | | | | | 24.7 | |
| Missouri plastic fireclay | 20.2 | 22.1 | 18.3 | 18.0 | 18.0 | 10.7 | 19.7 | 22.2 |
| Pitch | 9.1 | | 8.3 | 9.0 | 3.6 | 9.9 | 9.9 | |
| Lignin liquor | 2.0 | 2.3 | 1.8 | 1.1 | 1.1 | 1.2 | 1.2 | 2.3 |
| —200 mesh 50% ferrosilicon | | 5.5 | 9.2 | 9.0 | 9.0 | 9.9 | 9.9 | 11.1 |
| Trisodium Phosphate | | 2.3 | | | | | | |
| Bulk density (lbs./cu. ft.): | | | | | | | | |
| 2,550° F | 96 | 126 | 118 | 104 | 119 | 110 | 97 | 128 |
| 220° F | 134 | 138 | 135 | 127 | 141 | 130 | 123 | 146 |
| Modulus of rupture, 2,550° F. (p.s.i.) | 86 | 261 | 392 | 262 | 402 | 345 | 138 | 283 |
| Linear change, 2,550° F. (percent) | +.11 | 0 | +.05 | +.33 | +.77 | +.22 | —.17 | +.44 |
| Total carbon (percent) | 27.2 | 24.7 | 24.7 | 29.7 | 27.7 | 32.7 | 34.7 | 24.9 |
| Percent of carbon lost, 2,550° F | 74 | 20 | 24 | 34 | 30 | 18 | 34 | 20 |

Table II shows the effects of using 50 percent ferrosilicon as the antioxidant and also some further grain size variations in the bauxite and the carbon sources. Oxidation data at 2550° F. are comparable in Tables I and II, but the iron alloy does not impart nearly as much, if any, strength.

TABLE III.—EFFECT OF FERROSILICON ADDITION AND CARBON CONTENT ON OXIDATION OF CARBON RAMMING MIXES 9 x 4½ x 2½ inch specimens

|  | 1 | 2 | 3 | 4 |
|---|---|---|---|---|
| Ingredients (wt. percent): |  |  |  |  |
| ¼ in. on 30 mesh graphite | 20 | 20 | 35 | 50 |
| −35 mesh graphite | 10 | 10 | 15 | 20 |
| Ohio fireclay | 20 | 20 | 15 | 10 |
| ¼ to ⅛ in. calcined flint clay | 30 | 25 | 15 | 10 |
| ⅛ in. and fines flint clay | 20 | 15 | 10 | |
| 50% ferrosilicon | | 10 | 10 | 10 |
| Bulk density (lbs./ft.³): |  |  |  |  |
| 2,550° F | 117 | 133 | 118 | 107 |
| 2,100° F | 116 | 125 | 109 | 94 |
| 1,600° F | 122 | 128 | 114 | 102 |
| 200° F | 133 | 139 | 132 | 124 |
| Modulus of rupture (p.s.i.): |  |  |  |  |
| 2,550° F | 258 | 840 | 511 | 401 |
| 2,100° F | 244 | 368 | 199 | 127 |
| 1,600° F | 163 | 304 | 110 | 80 |
| Linear change (percent): |  |  |  |  |
| 2,550° F | +.33 | +.22 | +.66 | +.44 |
| 2,100° F | −.05 | −.17 | +.11 | −.05 |
| 1,600° F | +.17 | +.33 | +.66 | +.94 |
| Carbon content (percent) | 24 | 24 | 40 | 56 |
| Percent of carbon loss: |  |  |  |  |
| 2,550° F | 41 | 10 | 17 | 19 |
| 2,100° F | 45 | 36 | 41 | 45 |
| 1,600° F | 24 | 20 | 23 | 27 |

In Table III the results are given using compositions with calcined flint clay instead of bauxite, maintaining a coarse matrix and carbon addition with powdered 50 percent ferrosilicon. The Ohio fireclay employed probably aided in forming a protective layer. In this system the ferrosilicon developed definite strength, comparing No. 1, the control, with the others at 2550° F.

Reactivity of the ferrosilicon and silicon additions start occuring at 2100° F., as shown by strength results in Table III, but additional oxidation protection is not so evident until 2500° F.

The grain sizing as embodied in these compositions is protective of carbons as well as graphites.

TABLE IV.—PHYSICAL PROPERTIES OF COARSE CARBON FORMULATIONS CURED AT 1,000° F.

|  | 1 | 2 | 3 | 4 | 5 | 6 | 7 | 8 |
|---|---|---|---|---|---|---|---|---|
| Ingredients (wt. percent): |  |  |  |  |  |  |  |  |
| ¼ to ⅛ in. S. Am. bauxite | 20.2 | 20.2 | 10.0 | 25.0 | 20.2 | 20.2 | 20.2 | 20.2 |
| ⅛ in. and fines S. Am. bauxite | 20.2 | 20.2 | 10.0 | 25.0 | 20.2 | 20.2 | 20.2 | 20.2 |
| ¼ in. to 30 mesh natural graphite | 20.2 | 27.3 | 40.0 | 10.0 | | 10.1 | 20.2 | |
| ¼ in. and fines calcined coal | | | | | 20.2 | 10.1 | | 20.2 |
| −60 mesh calcined carbon | | | | | | | 8.1 | 8.1 |
| −35 mesh natural graphite | 8.1 | 10.1 | 8.0 | 8.0 | 8.1 | 8.1 | | |
| Plastic fireclay | 20.2 | 20.2 | 20.0 | 20.0 | 20.2 | 20.2 | 20.2 | 20.2 |
| Pitch pellets | 9.1 | | 10.0 | 10.0 | 9.1 | 9.1 | 9.1 | 9.1 |
| Dried lignin liquor | 2.0 | 2.0 | 2.0 | 2.0 | 2.0 | 2.0 | 2.0 | 2.0 |
| Bulk density (lbs./cu. ft.): |  |  |  |  |  |  |  |  |
| 1,000° F | 124 | 138 | 116 | 129 | 125 | 125 | 127 | 125 |
| 220° F | 133 | 138 | 121 | 133 | 127 | 127 | 127 | 124 |
| Modulus of rupture (lbs./sq. in.): 1,000° F | 515 | 295 | 435 | 683 | 930 | 1,018 | 584 | 2,325 |
| Linear change (percent): 1,000° F | +0.15 | −0.11 | +0.33 | +0.07 | +0.7 | −0.11 | −0.11 | −0.28 |

Table IV shows a range of carbon and graphite combinations which have been made. The cured strengths at 1000° F. to obtain pitch bonding shows high strengths to be imparted by crushed calcined coal. The formulations of Table IV perform in an excellent manner in hot areas adjacent to zones immersed in molten iron and steel. The use of a silicon or glassy sealer is required where the latter areas becomes uncovered and exposed to oxidation. Proven bauxitic ramming mixes containing 15 percent of −35 mesh graphite loses 60 percent of the carbon at 1600° F. and above (5 hour fire) and 90 percent at 2100° F. while the coarse matrix, coarse carbon systems of Table IV will lose from 25 to 50 percent of the carbon, with initial carbon contents of 28–48 percent, at 1600° F. to 2100° F. Numbers 1 and 2 of Table I show losses of 25–31 percent, at 1600° F.; No. 1 of Table III loses 24 percent carbn at 1600° F., and 45 percent at 2100° F.

The oxidation resistance of these composition is based not only on their grain structuring, as previously discussed, but by the relative resistance of carbons to burning as grain size increases. The accompanying drawing (a graph comparing burning rate of graded Madagasgar graphite against sieve size) shows this relationship. The graph is based on information by C. L. Mantell, Carbon and Graphite Handbook, 1968, p. 66. An extrapolation (shown by the Δ's in the drawing) to larger grain sizes was feasible due to the observation that the product of the burning rate and the sieve opening gave a constant value, very close to 5.0 in all cases. The sieve size average opening was extrapolated to 0.055 inch (1.4 mm.) in the figure where the burning rate is under 4 mg./g./min., as compared to about 13 mg./g./min. for a 35 mesh gain (.4 mm.). As we show particle sizings to ¾ inch (Table II) burning rates will be much less for most of the material.

The percentages, unless otherwise indicated, are in percent by weight, the sieve sizes are U.S. Standard Screen series and the diameters are mean diameters. The aggregates are particles agglomerated together to form larger discrete particles.

What is claimed is:

1. A refractory composition suitable for lining refractory monolithic linings such as for cupolas and blast furnaces consisting essentially of 60–16% by weight of calcined bauxite aggregates containing at least a 30% portion above 30 mesh and up to 1½ inch diameter grain size, 12–70% by weight of carbon particles containing at least a 30% portion above 30 mesh and up to 1½ inch diameter grain size and 4–24% by weight of plastic clay.

References Cited

UNITED STATES PATENTS 2,104,841  11/1938  White _____ 106—56
2,772,176  11/1956  Leitten _____ 106—56

JAMES E. POER, Primary Examiner

U.S. Cl. X.R.

106—65, 67